United States Patent [19]

Ogawa

[11] Patent Number: 4,466,848
[45] Date of Patent: Aug. 21, 1984

[54] METHOD FOR MAKING COVERS

[75] Inventor: Naoki Ogawa, Yokohama, Japan

[73] Assignee: Nissan Motor Company, Limited, Yokohama, Japan

[21] Appl. No.: 502,209

[22] Filed: Jun. 8, 1983

[30] Foreign Application Priority Data

Jun. 10, 1982 [JP] Japan .................................. 57-99556

[51] Int. Cl.³ .......................... B29C 27/10; B29C 3/00
[52] U.S. Cl. ...................................... 156/242; 264/257
[58] Field of Search ............... 264/248, 257, 258, 261; 428/285, 286; 156/242, 245

[56] References Cited

U.S. PATENT DOCUMENTS 2,943,009  6/1960  Mirsky et al. ..................... 264/258
3,041,217  6/1962  Fennebresque et al. ........... 264/134

FOREIGN PATENT DOCUMENTS 672144   5/1952  United Kingdom ............... 264/258
1266097  3/1972  United Kingdom ............... 264/257

Primary Examiner—Willard E. Hoag
Attorney, Agent, or Firm—Schwartz, Jeffery, Schwaab, Mack, Blumenthal & Koch

[57] ABSTRACT

A laminate is prepared, which comprises a base layer of a fibrous material mixed with a synthetic resin and its cross linking agent, a cover layer of unvulcanized rubber and an intermediate layer of thermoplastic resin. The laminate is shaped into a desired shape by the application of heat and pressure at such an elevated temperature as to cause the cross linking reaction of the synthetic resin in the base layer, the vulcanization reaction in the cover layer and a change of the thermoplastic resin into a soft and adhesive condition to take place simultaneously.

14 Claims, 4 Drawing Figures

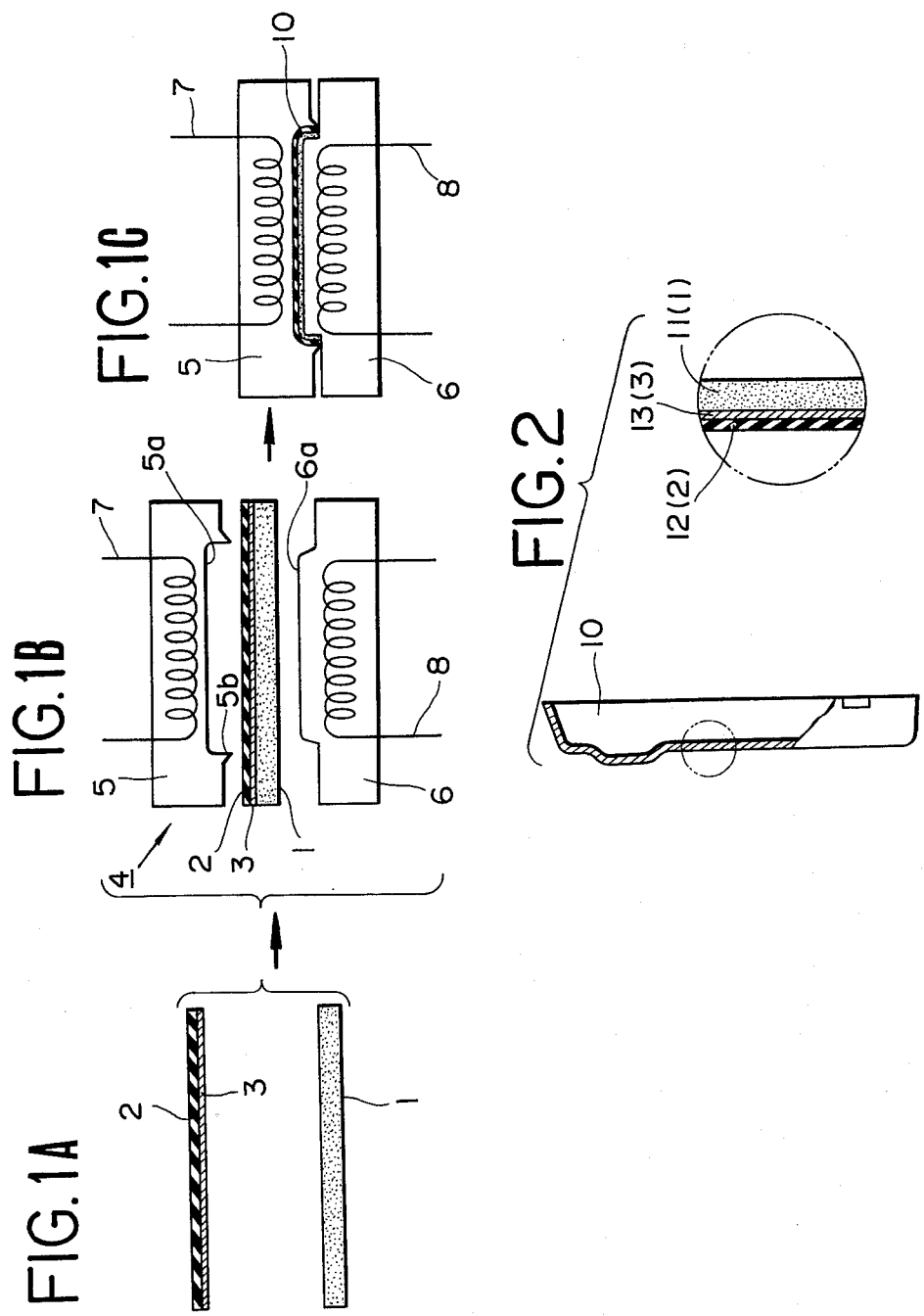

METHOD FOR MAKING COVERS

BACKGROUND OF THE INVENTION

The present invention relates to a method for making various covers to be used in connection with an engine, and more specifically to a method for making such covers which are mainly made of a fibrous material having a good damping capacity.

Various covers are used for internal combustion engines. For example, there are rocker covers (cylinder head covers), front covers, dust covers, undercovers, engine air filter casings and their covers, noise reducing covers located in the vicinity of an engine, oil pans and hood insulators. These covers must be water-proof, oil-proof, light in weight, hard to some extent, and shape-retentive to some extent.

These covers are usually made of sheet metal, plastic or other hard material. Covers made of such a hard material are easily excited by the vibrations of an engine, and they tend to become a secondary source of noises which increases the engine noise.

Recently, there have been proposed covers which are made of a fibrous material having an excellent capability in absorbing sound and mechanical vibration. For example, Japanese Patent provisional publication Sho 54-80387 discloses such covers. Covers of this kind are made by mixing a synthetic resin and its cross linking agent to a fibrous material, and pressing the resultant mixture into a desired shape and a densely compressed state by the application of heat and pressure.

In order to make such covers impervious to rain water and engine lubricating oil, it is necessary to cover one or both of the surfaces of the fibrous material layer with a rubber layer having a water-proofness and an oil-proofness, because the layer of the fibrous material is not impervious in itself. It is, however, desirable to make the rubber layer as thin as possible because the rubber layer increases the weight of a cover, and raises the cost of material.

SUMMARY OF THE INVENTION

It is an object of the present invention to provide a convenient method which makes it possible to easily produce a cover of a laminated structure having a base layer of a fibrous material providing the cover with a good capability in absorbing noise and vibration, and a water-proof layer of a rubber material which is uniform in thickness and made as thin as possible.

According to the present invention, a fibrous sheet, an unvulcanized rubber sheet and a thermoplastic resin film are prepared first. The fibrous sheet is made of a fibrous composition comprising fiber material, synthetic resin and its cross linking agent. The unvulcanized rubber sheet is made of an unvulcanized rubber composition comprising unvulcanized rubber. After that, a laminate is made, which comprises the fibrous sheet, the unvulcanized rubber sheet and the thermoplastic resin film placed between the fibrous sheet and the unvulcanized rubber sheet. The thus made laminate is shaped into a desired shape by applying pressure and heat at such an elevated temperature as to cause the cross-linking reaction of the synthetic resin in the fibrous sheet, the vulcanization reaction of the unvulcanized rubber in the unvulcanied rubber sheet, and a change of the thermoplastic resin film to a soft and adhesive condition, to take place simultaneously.

BRIEF DESCRIPTION OF THE DRAWINGS

FIG. 1 is an illustration for showing the producing process according to the present invention; and FIG. 2 is a sectional view of a cover made by the process of FIG. 1.

DETAILED DESCRIPTION OF THE INVENTION

One embodiment of the present invention is shown in FIGS. 1 and 2. FIG. 2 shows an engine dust cover 10 by way of example, and FIG. 1 show the process for making the dust cover 10. The dust cover 10 is made of a laminated plate consisting of a base layer 11, an impermeable layer 12, and an adhesive layer 13 placed between the base layer 11 and the impermeable layer 12. First, a fibrous material 1 for forming the base layer 11 is prepared by mixing synthetic resin such as phenol resin and its cross linking agent such as formalin, to organic fibers such as wool, cotton, acetate fibers, polyester fibers, or inorganic fibers such as glass wool and rock wool. For convenience of transport and handling, the fibrous material 1 is formed into a sheet having a thickness of about 25 mm by application of heat for a short time at a temperature ranging from 150° C. to 170° C. On the other hand, an unvulzanized rubber material 2 is prepared for forming the impermeable layer 12. For example, nitrile rubber, acrylic rubber, or epichlorohydrin rubber is used as the unvulcanized rubber material 2. After mixing ingredients to the unvulcanized rubber material 2, the unvulcanized rubber material 2 is formed into a sheet having a thickness of about 0.3 mm by calender. A thermoplastic resin film 3 for forming the adhesive layer 13 is tightly overlaid on one side of the sheet of the unvulcanized rubber 2 by slightly pressing, and then the unvulcanized rubber sheet covered with the resin film 3 is cut into a desired shape. The resin film 3 overlaid on the unvulcanized rubber sheet serves to prevent the unvulcanized rubber sheet from sticking to another unvulcanized rubber sheet during storage or transportation. As the thermoplastic resin film 3, polyvinyl chloride, nylon 12, acetate, polypropylene or the like is used. The thickness of the resin film 3 is about 0.05 mm, by way of example.

The fibrous material sheet 1 and the unvulcanized rubber sheet 2 covered with the resin film 3 which are thus prepared separately, are arranged in a laminate, and positioned between an upper press die 5 and a lower press die 6 of a press machine 4. The upper die 5 and lower die 6 have, respectively, faces 5a and 6a having configurations for forming the shape of the dust cover 10. The upper die 5 (or the lower die 6) may have a cutting edge 5b for trimming, on the outer periphery of the face 5a if the shape of products permits such trimming. The upper and lower dies 5 and 6 are, respectively, provided with heating elements 7 and 8. During operation, the lower die 6 to be in contact with the fibrous material sheet 1 is heated to a temperature from 150° C. to 230° C. by the heating element 8, and the upper die 5 to be in contact with the unvulcanized rubber sheet 2 is heated to a temperature of from 140° C. to 170° C. Under such heated conditions, the laminate of the fibrous material sheet 1, the unvulcanized rubber sheet 2 and the thermoplastic resin film 3 is formed into the shape of the dust cover 10 by applying pressure, as shown in FIG. 1(C). In this case, a relatively high pressure of about 20 to 50 kg/cm² is applied, and the thickness of the three-layer laminate is compressed to about 2 mm.

By the application of heat and pressure, the cross linking reaction of the contained synthetic resin takes place in the fibrous material sheet 1, and the sheet 1 is formed into the base layer 11 which is densely compressed, and has a sufficient capability in retaining its shape. At the same time, in the unvulcanized rubber material sheet 2, the vulcanization reaction takes place by the application of heat, and the impermeable layer 12 having the configuration of the face 5a of the upper die 5 is formed. The impermeable layer 12 made by this method is very thin and uniform. In parallel with the cross linking reaction and the vulcanization reaction, the thermoplastic film 3 softens and becomes adhesive. Thus, the thermoplastic resin film 3 firmly bonds the base layer 11 and the unpermeable layer 12, and becomes the adhesive layer 13.

The thermoplastic resin film 3 prevents the unvulcanized rubber material 2 from passing into the fibrous material sheet 1, and by so doing, serves to make the impermeable layer 12 uniform and thin. The thermoplastic resin film 3 is shaped simultaneously with the fibrous material sheet 1 and the unvulcanized rubber sheet 2, so that cracks and other irregularities hardly occur in the thermoplastic resin film 3 even if the shape to be formed is complex. Because the thermoplastic resin film 3 is almost free from defect, the impermeable layer, too, is almost free from a defect which would be caused by the rubber material 2 permeating into the fibrous material sheet 1 through a defect of the thermoplastic film 3. Besides, the defect-free adhesive layer can provide a satisfactory adhesion of the impermeable layer.

One example is shown in Table 1, in which the thicknesses before and after the forming process are listed. As evident from Table 1, the impermeable layer 12 is made very thin.

TABLE 1

| Thickness of Laminated Layers (mm) | | |
|---|---|---|
| | Before shaping | After shaping |
| Impermeable layer (rubber sheet) | 0.3 | 0.22 |
| Adhesive layer (resin film) | 0.05 | 0.05 |
| Base layer (fibrous sheet) | 25 | 1.73 |
| Total | | 2.00 |

A cover having two impermeable layers covering both surfaces of the cover can be made in a similar manner. If a cover requires a decorative appearance as in the case of a rocker cover, it is possible to make a cover having such a decorative appearance. In this case, laminated sheets including a decorative sheet made of thermoplastic resin, non-woven fabric or the like, placed on the outer surface of the unvulcanized rubber sheet are shaped simultaneously by the application of heat and pressure. One example is shown in Table 2 in terms of thickness.

TABLE 2

| Thickness of Laminated Layers (mm) | | |
|---|---|---|
| | Before shaping | After shaping |
| Non-woven fabric | 0.16 | 0.16 |
| Impermeable layer | 0.3 | 0.22 |

TABLE 2-continued

| Thickness of Laminated Layers (mm) | | |
|---|---|---|
| | Before shaping | After shaping |
| (rubber sheet) | | |
| Adhesive layer (resin film) | 0.05 | 0.05 |
| Base layer (fibrous sheet) | 25 | 1.57 |
| Total | | 2.00 |

According to the present invention, covers having a good damping capacity can be made easily and inexpensively by a single step. The fibrous sheet and the rubber sheet are shaped and bonded together simultaneously without any additional bonding step which would be very troublesome especially when the shape of a cover is complicated. Besides, the impermeable rubber layer made by this method is almost free from wrinkles or other defects, and its thickness can be made very thin and uniform. Accordingly, covers made by this method are not only excellent in damping capacity, but also light in weight and inexpensive.

What is claimed is:

1. A method of making a shaped plate to be used as a cover, comprising:
   preparing a fibrous sheet of a fibrous composition comprising fiber material, synthetic resin and its cross linking agent,
   preparing a sheet comprised of unvulcanized rubber,
   preparing a thermoplastic resin film,
   making a laminate comprising said fibrous sheet, said unvulcanized rubber sheet and said thermoplastic resin film placed between said fibrous sheet and said unvulcanized rubber sheet, by putting one upon another,
   shaping said laminate by applying pressure and heat at such an elevated temperature as to cause the cross-linking reaction of said synthetic resin, the vulcanization of said unvulcanized rubber, and a change of said thermoplastic resin to a soft and adhesive condition, to take place simultaneously.

2. The method according to claim 1, wherein said fiber material is at least one of the group consisting of organic fibers and inorganic fibers.

3. The method according to claim 2, wherein said organic fibers are at least one of the group consisting of wool, cotton, acetate fibers and polyester fibers.

4. The method according to claim 2, wherein said inorganic fibers are at least one of the group consisting of glass wool and rock wool.

5. The method according to claim 1, wherein said unvulcanized rubber is at least one of the group consisting of nitrile rubber, acrylic rubber and epichlorohydrin rubber.

6. The method according to claim 1, wherein said thermoplastic resin film is one of the group consisting of polyvinyl chloride, nylon 12, acetate and polypropylene.

7. The method according to claim 7, wherein said synthetic resin is phenolic resin, and said cross linking agent is formalin.

8. The method according to claim 1, wherein the thickness of said fibrous sheet is about 25 mm, the thickness of said thermoplastic resin film is about 0.05 mm, and the thickness of said unvulcanized rubber sheet is about 0.3 mm.

9. The method according to claim 8, wherein said laminate is shaped by pressing the same between a first die which is in contact with the outer surface of said fibrous sheet and maintained at a temperature ranging from 150° to 230° C., and a second die which is in contact with the outer surface of said unvulcanized rubber sheet and maintained at a temperature from 140° to 170° C.

10. The method according to claim 9, wherein the thickness of said laminate is reduced to about 2 mm by applying pressure during the shaping step.

11. The method according to claim 10, wherein a pressure applied to said laminate during the shaping step is about 20 to 50 kg/cm$^2$.

12. The method according to claim 1, further comprising a step of preparing another unvulcanized rubber sheet of an unvulcanized rubber composition comprising unvulcanized rubber, and another thermoplastic resin film, and wherein said laminate comprises a combination of said fibrous sheet and two thermoplastic resin films between which said fibrous sheet is placed, and two unvulcanized rubber sheets between which said combination is placed.

13. The method according to claim 1, further comprising preparing a decorative sheet, and wherein said laminate further comprises said decorative sheet covering the surface of said unvulcanized rubber sheet.

14. The method according to claim 13, wherein said decorative sheet is made of thermoplastic resin or nonwoven fabric.

* * * * *